(12) United States Patent
Bergljung et al.

(10) Patent No.: US 10,917,264 B2
(45) Date of Patent: Feb. 9, 2021

(54) NR-LTE COEXISTING OPERATION FOR UPLINK

(71) Applicant: Telefonaktiebolaget LM Ericsson (publ), Stockholm (SE)

(72) Inventors: Christian Bergljung, Lund (SE); Havish Koorapaty, Saratoga, CA (US); Daniel Chen Larsson, Lund (SE); Ravikiran Nory, Buffalo Grove, IL (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 82 days.

(21) Appl. No.: 16/186,337

(22) Filed: Nov. 9, 2018

(65) Prior Publication Data

US 2020/0153663 A1 May 14, 2020

(51) Int. Cl.
| H04L 25/02 | (2006.01) |
| H04L 5/00 | (2006.01) |
| H04W 72/04 | (2009.01) |
| H04W 72/12 | (2009.01) |

(52) U.S. Cl.
CPC ........ H04L 25/0226 (2013.01); H04L 5/0048 (2013.01); H04W 72/042 (2013.01); H04W 72/0446 (2013.01); H04W 72/1257 (2013.01)

(58) Field of Classification Search
None
See application file for complete search history.

(56) References Cited

U.S. PATENT DOCUMENTS

| 2006/0002323 | A1 | 1/2006 | Hildebrand et al. | |
| 2014/0376482 | A1* | 12/2014 | Kim | H04L 5/0094 370/329 |
| 2015/0280894 | A1* | 10/2015 | Charbit | H04B 7/2656 370/281 |
| 2018/0323928 | A1* | 11/2018 | Yang | H04L 5/0048 |
| 2018/0368199 | A1* | 12/2018 | Zeng | H04B 7/2643 |
| 2019/0273594 | A1* | 9/2019 | Seo | H04L 5/0051 |
| 2020/0163095 | A1* | 5/2020 | Kim | H04W 76/16 |

OTHER PUBLICATIONS

European Search Report and Opinion, EP 19173545.5, dated Oct. 14, 2019, 11 pages.
"Considerations of NR UL Operation for LTE-NR Coexistence," (R1-1704199) 3GPP TSG RAN WG1 Meeting #88bis, Spokane, WA, USA, Apr. 3-7, 2017 (XP051242351) Agenda Item 8.1.8, Huawei, HiSilicon, 7 pages.
"Discussion on LBT for LAA UL," (R1-1510149) 3GPP TSG RAN WG1 Ad-hoc Meeting, Paris, France, Mar. 24-26, 2015, (XP050951413) Agenda Item 2.2, Samsung, 5 pages.

(Continued)

*Primary Examiner* — Jutai Kao
(74) *Attorney, Agent, or Firm* — Sage Patent Group (57) ABSTRACT

Methods of operating a network device for a user equipment, UE, in a telecommunications network is provided. Methods include generating a transmission gap at an end of a first type of uplink, UL, transmission and scheduling a second type of UL transmission that corresponds to the transmission gap. Generating the transmission gap includes sending, to the UE, a radio resource control that configures a potential sounding reference signal, SRS, transmission that generates the transmission gap.

23 Claims, 7 Drawing Sheets

(56) References Cited

OTHER PUBLICATIONS

"Design Principles for HD-FDD Operation," (R1-080378) 3GPP TSG-RAN Working Group 1 Meeting #51bis, Seville, Spain, Jan. 14-18, 2008, (XP050108897) Agenda Item 6.1.7, Nortel, 5 pages.
"$3^{rd}$ Generation Partnership Project; Technical Specification Group Radio Access Network; Evolved Universal Terrestrial Radio Access (E-UTRA); Physical Channels and Modulation (Release 15)," (XP051474769) 3GPP TS 36.211 V15.2.0 (Jun. 2018) 236 pages.

* cited by examiner

NR-LTE COEXISTING OPERATION FOR UPLINK

FIELD OF INVENTIVE CONCEPT

The present disclosure relates generally to communications, and more particularly, to wireless communications and related wireless devices and network nodes.

BACKGROUND

Figure 1:
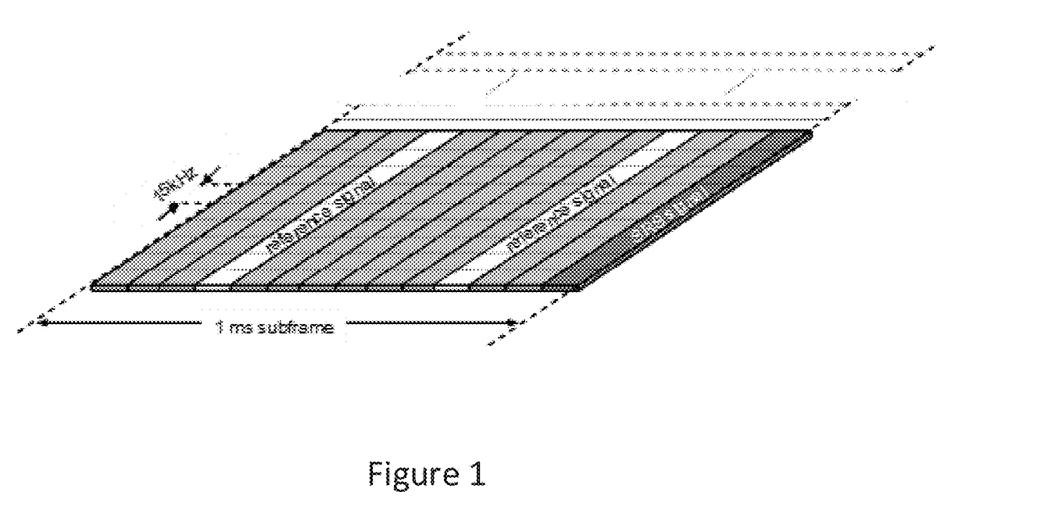
FIG. 1 is a schematic block diagram that illustrates an uplink transmission subframe defining SRS and having a time duration of a single orthogonal frequency division multiplex (OFDM) symbol.

Sounding reference signals (SRS) are known signals that may be transmitted by user equipment (UEs) so that the eNodeB can estimate different uplink-channel properties. These estimates may be used for uplink scheduling and link adaptation but also for downlink multiple antenna transmission, especially in case of time division duplex (TDD) in which the uplink and downlink use the same frequencies. For example, brief reference is made to FIG. 1, which is a schematic block diagram that illustrates an uplink transmission subframe defining SRS and having a time duration of a single orthogonal frequency division multiplex (OFDM) symbol.

SRS can be transmitted in the last symbol of a 1 ms uplink subframe, and for the case with TDD, the SRS can also be transmitted in the special slot UpPTS. The length of UPTS can be configured to be one or two symbols. For example, brief reference is made to FIG. 2, which is a schematic block diagram illustrating, for a TDD, a 3DL:2UL configuration. As illustrated, within a 10 ms radio frame, up to eight symbols may be set aside for SRS.

The configuration of SRS symbols, such as SRS bandwidth, SRS frequency domain position, SRS hopping pattern and SRS subframe configuration may be set semi-statically as a part of RRC information element.

There may be two types of SRS transmission in LTE UL. The two types include periodic and aperiodic SRS transmissions. Periodic SRS may be transmitted at regular time instances as configured using RRC signaling. Aperiodic SRS may be a one shot transmission that is triggered by signaling in PDCCH.

Figure 2:
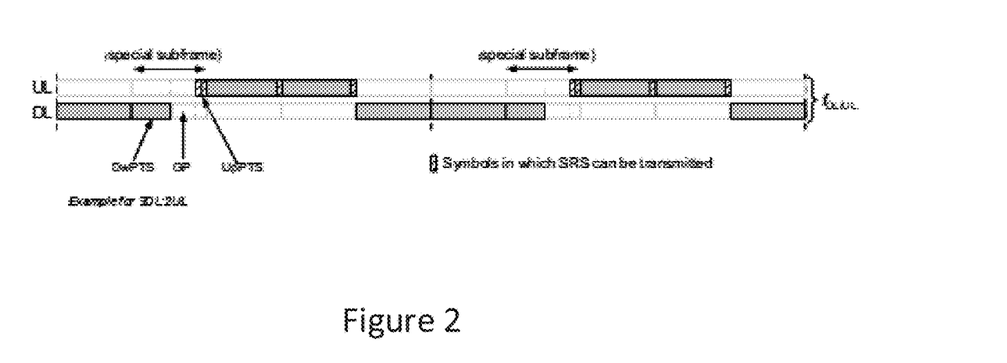
FIG. 2 is a schematic block diagram illustrating, for a TDD, a 3DL:2UL configuration.

There may be two different configurations related to SRS. A first configuration may include a cell specific SRS configuration and a second configuration may include a UE specific configuration. The cell specific configuration may indicate which subframes may be used for SRS transmissions within the cell as illustrated in FIG. 2.

The UE specific configuration may indicate to the terminal, a pattern of subframes among the subframes reserved for SRS transmission within the cell and frequency domain resources to be used for SRS transmission of that specific UE. The UE specific configuration may also include other parameters that the UE shall use when transmitting the signal, such as frequency domain comb and cyclic shift.

In this manner, sounding reference signals from different UEs can be multiplexed in the time domain, by using UE-specific configurations such that the SRS of the two UEs are transmitted in different subframes. Furthermore, within the same symbol, SRS can be multiplexed in the frequency domain. The set of subcarriers may be divided into two sets of subcarriers, or combs with the even and odd subcarriers respectively in each such set. Additionally, UEs may have different bandwidths to get additional frequency domain multiplexing (FDM). The comb may enable frequency domain multiplexing of signals with different bandwidths and also overlapping. Additionally, code division multiplexing can be used. Then different users can use exactly the same time and frequency domain resources by using different shifts of a basic base sequence.

SUMMARY

Some embodiments of the inventive concept are directed to methods of operating a network device for one or more user equipments, UE, in a telecommunications network. Methods may include generating, based on a first configuration from the network device, a transmission gap in a first type of uplink, UL, transmission and scheduling, based on a second configuration from the network device, a second type of UL transmission that corresponds to the transmission gap.

In some embodiments, generating the transmission gap includes sending, to the UE, an LTE sounding reference signal, SRS, pattern that is configured to generate the transmission gap that occurs at a time corresponding to a potential new radio, NR, transmission. Some embodiments provide the potential NR transmission includes an SRS.

In some embodiments, the transmission gap is generated for a first UE that is an LTE UE and the second type of UL transmission is from a second UE that is a NR UE. Some embodiments provide that the LTE UE and the NR UE are the same UE. In some embodiments, the LTE UE and the NR UE are the different UEs.

Some embodiments provide that the transmission gap is configured using a cell specific LTE SRS pattern that includes an empty orthogonal frequency division multiplexing, OFDM, symbol. In some embodiments, the cell specific LTE SRS pattern includes a cell specific subframe configuration period $T_{SFC}$ and a cell-specific subframe offset $\Delta_{SFC}$. Some embodiments provide that the UE is further configured not to transmit SRS in configured instances of UL subframes.

In some embodiments, generating the transmission gap includes including a timing advance on an LTE transmission of the UE to create the transmission gap between the UL and down link, DL, transmissions. Some embodiments provide that the timing advance is applied on the LTE transmission to cause the transmission gap to be at an end of a corresponding UL subframe.

In some embodiments, the transmission gap includes a first portion and a second portion. The first portion of the transmission gap is configured using a cell specific SRS pattern and the second portion of the transmission gap is configured by a timing advance on an LTE transmission of the UE to create the transmission gap between the UL and down link, DL, transmissions.

Some embodiments include causing, by the network device, the UE to transmit an NR signal and/or channel during the transmission gap that is generated at an end of a subframe that overlaps with an LTE UL subframe.

Some embodiments are directed to a network node that is operatively configured with one or more user equipments, UE, in a telecommunications network. The network node is configured to perform operations comprising generating, based on a first configuration from the network node, a transmission gap at an end of an LTE UL transmission and scheduling, based on a second configuration from the network node, a NR UL transmission that corresponds to the transmission gap.

In some embodiments, generating the transmission gap comprises sending, to the UE, an LTE sounding reference signal, SRS, pattern that is configured to generate the transmission gap that at a time that corresponds with a potential new radio, NR, transmission. In some embodiments, the potential NR transmission includes an SRS.

Some embodiments provide that the transmission gap is generated for a first UE that is an LTE UE and the second type of UL transmission is from a second UE that is a NR UE. In some embodiments, the LTE UE and the NR UE are the same UE. Some embodiments provide that the LTE UE and the NR UE are the different UEs.

In some embodiments, the transmission gap is configured using a cell specific LTE SRS pattern that includes an empty orthogonal frequency division multiplexing, OFDM, symbol. Some embodiments provide that the cell specific LTE SRS pattern includes a cell specific subframe configuration period $T_{SFC}$ and a cell-specific subframe offset $\Delta_{SFC}$. In some embodiments, the UE is further configured not to transmit SRS in configured instances of UL subframes.

In some embodiments, generating the transmission gap includes including a timing advance on an LTE transmission of the UE to create the transmission gap between the UL and down link, DL, transmissions. Some embodiments provide that the timing advance is applied on the LTE transmission to cause the transmission gap to be at an end of a corresponding UL subframe.

In some embodiments, the transmission gap includes a first portion and a second portion. The first portion of the transmission gap is configured using a cell specific SRS pattern and the second portion of the transmission gap is configured by a timing advance on an LTE transmission of the UE to create the transmission gap between the UL and down link, DL, transmissions.

In some embodiments, the network node is further configured to cause the UE to transmit an NR signal and/or channel during the transmission gap that is generated at an end of a subframe that overlaps with an LTE UL subframe.

Embodiments herein include computer program products comprising a non-transitory computer readable medium storing program code that when executed by a processor of a network node causes the network node to perform operations of the methods, devices and systems disclosed herein.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 9:
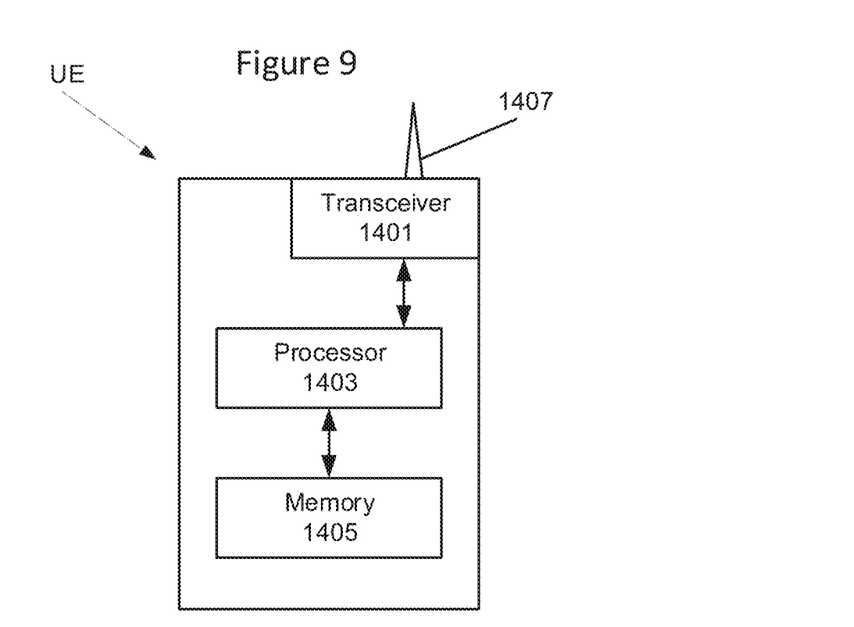
FIG. 9 is a block diagram illustrating a wireless device UE according to some embodiments of inventive concepts.

FIG. 9 is a block diagram illustrating elements of a wireless device UE (also referred to as a wireless terminal, a wireless communication device, a wireless communication terminal, user equipment, UE, a user equipment node/terminal/device, etc.) configured to provide wireless communication according to embodiments of inventive concepts. As shown, wireless device UE may include an antenna 1407, and a transceiver circuit 1401 (also referred to as a transceiver) including a transmitter and a receiver configured to provide uplink and downlink radio communications with a base station eNB of a wireless communication network (also referred to as a radio access network RAN). Wireless device UE may also include a processor circuit 1403 (also referred to as a processor) coupled to the transceiver circuit, and a memory circuit 1405 (also referred to as memory) coupled to the processor circuit. The memory circuit 1405 may include computer readable program code that when executed by the processor circuit 1403 causes the processor circuit to perform operations according to embodiments disclosed herein. According to other embodiments, processor circuit 1403 may be defined to include memory so that a separate memory circuit is not required. Wireless device UE may also include an interface (such as a user interface) coupled with processor 1403, and/or wireless device UE may be an IoT and/or MTC device.

As discussed herein, operations of wireless device UE may be performed by processor 1403 and/or transceiver 1401. For example, processor 1403 may control transceiver 1401 to transmit uplink communications through transceiver 1401 over a radio interface to a base station eNB of a wireless communication network and/or to receive downlink communications through transceiver 1401 from a base station eNB of the wireless communication network over a radio interface. Moreover, modules may be stored in memory 1405, and these modules may provide instructions so that when instructions of a module are executed by processor 1403, processor 1403 performs respective operations (e.g., operations discussed below with respect to Example Embodiments).

Figure 10:
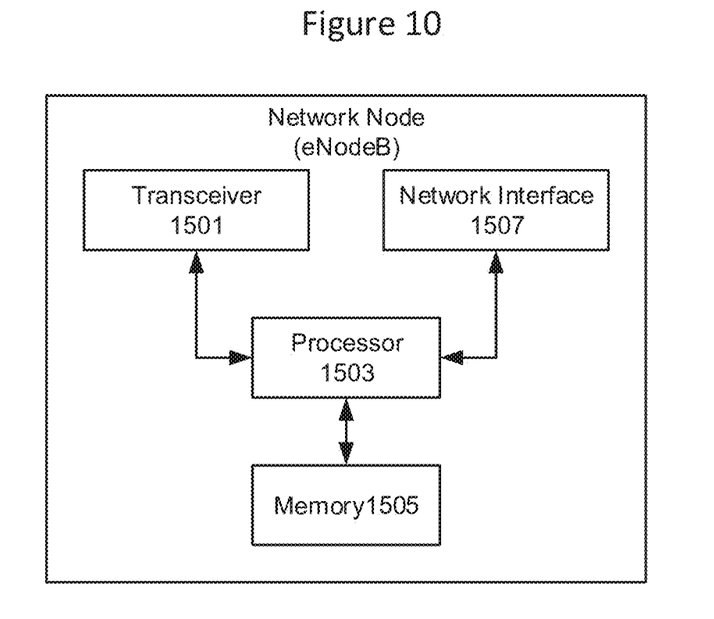
FIG. 10 is a block diagram illustrating a network node eNB according to some embodiments of inventive concepts.

FIG. 10 is a block diagram illustrating elements of a node (also referred to as a network node, base station, eNB, eNodeB, etc.) of a wireless communication network (also referred to as a Radio Access Network RAN) configured to provide cellular communication according to embodiments of inventive concepts. As shown, the network node may include a transceiver circuit 1501 (also referred to as a transceiver) including a transmitter and a receiver configured to provide uplink and downlink radio communications with wireless devices. The network node may include a network interface circuit 1507 (also referred to as a network interface) configured to provide communications with other nodes (e.g., with other base stations and/or core network nodes) of the RAN. The network node may also include a processor circuit 1503 (also referred to as a processor) coupled to the transceiver circuit, and a memory circuit 1505 (also referred to as memory) coupled to the processor circuit. The memory circuit 1505 may include computer readable program code that when executed by the processor circuit 1503 causes the processor circuit to perform operations according to embodiments disclosed herein. According to other embodiments, processor circuit 1503 may be defined to include memory so that a separate memory circuit is not required.

As discussed herein, operations of the network node may be performed by processor 1503, network interface 1507, and/or transceiver 1501. For example, processor 1503 may control transceiver 1501 to transmit downlink communications through transceiver 1501 over a radio interface to one or more UEs and/or to receive uplink communications through transceiver 1501 from one or more UEs over a radio interface. Similarly, processor 1503 may control network interface 1507 to transmit communications through network interface 1507 to one or more other network nodes and/or to receive communications through network interface from one or more other network nodes. Moreover, modules may be stored in memory 1505, and these modules may provide instructions so that when instructions of a module are executed by processor 1503, processor 1503 performs respective operations (e.g., operations discussed below with respect to Example Embodiments).

Figure 3:
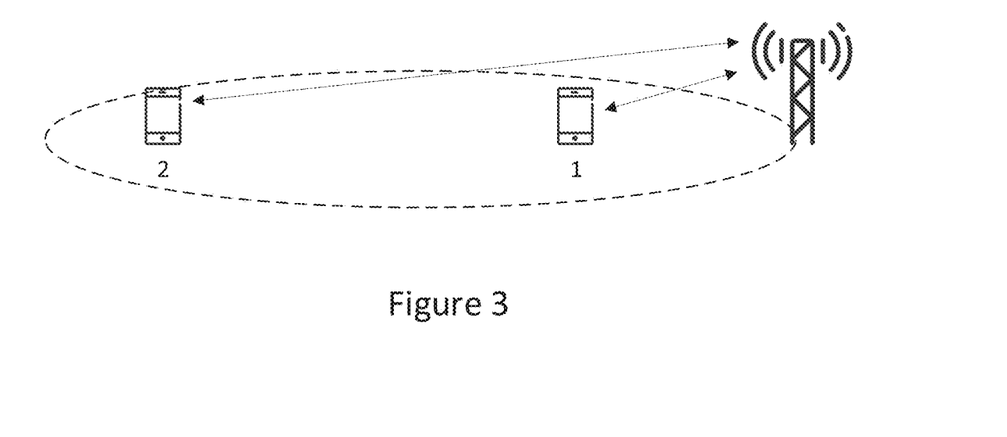
FIG. 3 is a schematic diagram illustrating a cell with two UEs at different distances according to some embodiments of the present concepts.

To preserve the orthogonality in UL, the UL transmissions from multiple UEs may need to be time aligned at the eNodeB. Since UEs may be located at different distances from the eNodeB, the UEs may need to initiate their UL transmissions at different times. Brief reference is now made to FIG. 3, which is a schematic diagram illustrating a cell with two UEs at different distances according to some embodiments of the present concepts. For example, a UE that is far from the eNodeB (UE2) needs to start transmission earlier than a UE close to the eNodeB (UE1). In some embodiments, this may be handled by time advance of the UL transmissions in which a UE starts its UL transmission before a nominal time given by the timing of the DL signal received by the UE. For example, brief reference is mow made to FIG. 4, which is a schematic timing diagram illustrating the timing advance of UL transmissions depending on distance to eNodeB according to some embodiments of the present concepts.

Figure 4:
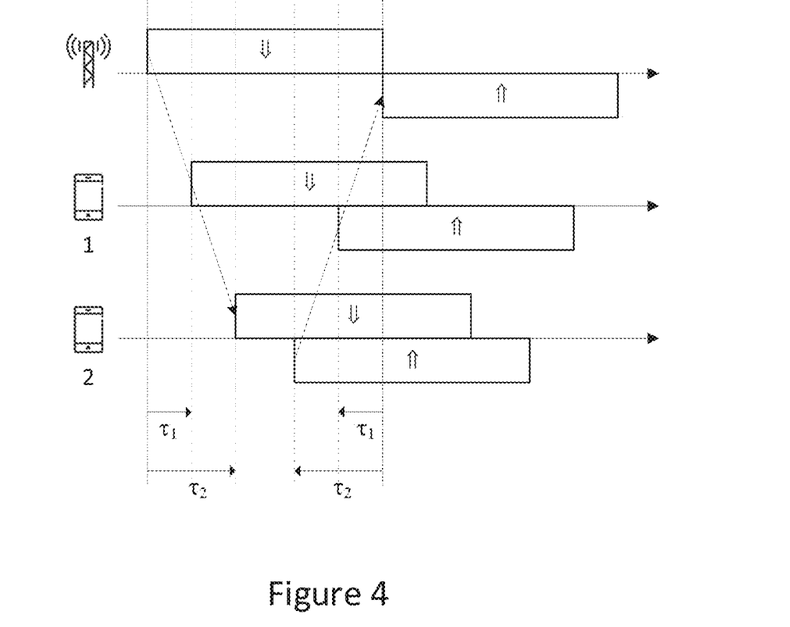
FIG. 4 is a schematic timing diagram illustrating the timing advance of UL transmissions depending on distance to eNodeB according to some embodiments of the present concepts.

The UL timing alignment may be maintained by the eNodeB through timing alignment commands to the UE based on measurements on UL transmissions from that UE. As shown in FIG. 4 the propagation delay $\pi t$ and $\pi 2$ for UE1 and UE2 respectively, may be the same in UL and DL.

Through timing alignment commands, the UE may be ordered to start its UL transmissions earlier. This may apply to all UL transmissions except for initial access, such as the random access preamble transmissions on PRACH for LTE (including transmissions on both PUSCH and PUCCH).

In some embodiments, there may be a strict relation between DL transmissions and the corresponding UL transmission. Examples of such relation in LTE include the timing between a DL-SCH transmission on PDSCH to the HARQ ACK/NACK feedback transmitted in UL (either on PUCCH or PUSCH) and the timing between an UL grant transmission on PDCCH to the UL-SCH transmission on PUSCH. By increasing the timing advance value for a UE, the UE processing time between the DL transmission and the corresponding UL transmission may decrease. For this reason, an upper limit on the maximum timing advance has been defined by 3GPP in order to set a lower limit on the processing time available for a UE. For LTE, this value has been set to roughly 667 us, which corresponds to a cell range of 100 km. Note that the TA value may compensate for the round-trip delay.

Figure 5:
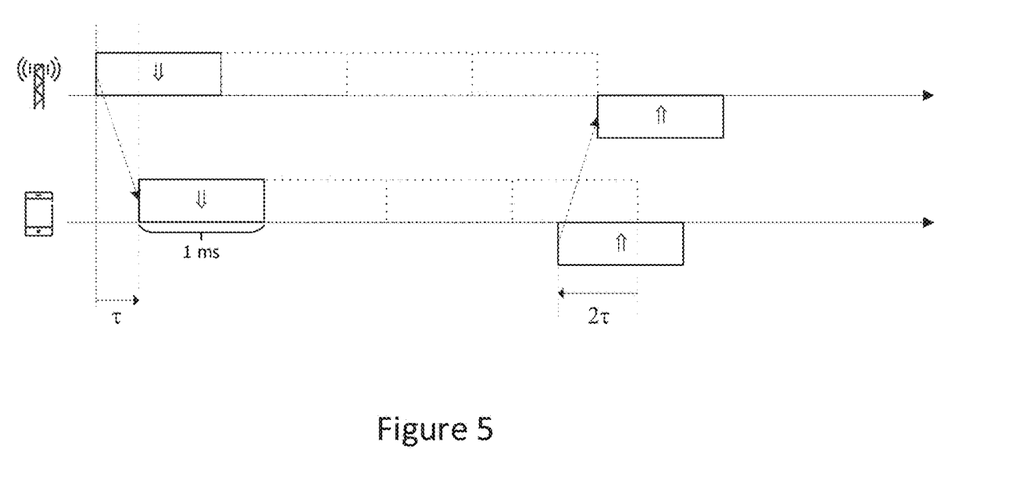
FIG. 5 is a schematic timing diagram illustrating the impact of TA on processing time according to some embodiments of the present inventive concept.

Brief reference is now made to FIG. 5, which is a schematic timing diagram illustrating the impact of TA on processing time according to some embodiments of the present inventive concept. In current LTE, the processing time is N+4, meaning that if a UE receives, for example, a PDSCH in subframe 3, it is expected to respond with HARQ information (on PUCCH) in subframe 7 (3+4). Hence, the nominal processing time allowed may be 3 ms. However, considering propagation delay and the maximum allowed TA, the processing time may become 3−0.667=2.333 ms. Hence, $\pi$=0.33 ms, which is the maximum allowed propagation delay and, over the air, corresponds to a cell size of roughly 100 km (3e8*0.33e−3).

As disclosed herein, numerous different advantages may be gained using solutions according to embodiments of the present inventive concept. A first scenario that may be addressed herein includes a condition in which 1 the UE is operating in EN-DC or NE-DC mode and thus may be connected to NR and LTE at the same time but not on overlapping frequencies. Conventionally, the UE may not be capable of processing an NR side transmission if the NR side transmission overlaps in time with an LTE transmission if they are scheduled later than the NR transmission. This may be due a power control based on an interaction between the NR and LTE side of the UE chipset. While one solution may include making the NR timeline as slow or slower that the LTE timeline, such solution may result in the loss of the quick NR timeline. This may be particularly true for certain intra-band EN-DC band combinations in which the UE may reuse the same PA for both LTE and NR.

A second scenario may include that the network is operating NR and LTE in an overlapping frequency. The bandwidths used may not be the same from a carrier perspective and different NR UEs can further have different carrier bandwidths. On the specific carrier, UEs may operate either NR or LTE, but not the same for both RATs. The network may not be able to handle the circumstance in which NR and LTE transmissions collide with each other. If the network is operating on a TDD frequency, the amount of UL subframe on the LTE side may be very limited and hence frequency domain splitting for resources may not always work. Thus, embodiments herein may provide frequency domain splitting between the NR and LTE transmission from different UEs.

A third scenario provides that the network is operating NR and LTE in an overlapping frequency. The bandwidths used may not be the same from a carrier perspective and different NR UEs can further have different carrier bandwidths. On the specific carrier, the relevant UEs may operate both NR or LTE, but not in the same time instance. It may not be possible to UE to transmit NR and LTE at the same. If the UE is scheduled for an LTE PUSCH transmission, the UL for NR side may be blocked from being able to send any HARQ-ACK feedback to the network.

In some embodiments, the network (eNB) may configure the UE with a cell specific SRS pattern and a wide SRS bandwidth. Such configuration may create an empty OFDM symbol at the end of a PUSCH and/or PUCCH transmission from an LTE transmission. Some embodiments provide that the empty OFDM symbol may be used by a UE operating NR to transmit a PUCCH of either 1 or 2 OFDM symbols. Example embodiments may include those in which NR is using 15 kHz or 30 kHz, however, such frequencies are non-limiting examples as NR may use frequencies other than 15 kHz and 30 kHz.

In some embodiments that may be applicable to TDD and/or FDD systems, the network may configure the UE with an additional timing advance, so that a gap is created when the UE is switching between UL and DL for LTE. During the gap, the UE may not be transmitting or receiving anything related to LTE. In this manner, either another UE or the same UE may transmit an NR transmission during the gap. Transmissions by either UE may include PUSCH, PUCCH, SRS and/or PRACH according to some embodiments.

In reference to the first scenario described above, embodiments herein may provide the option to operate with a UE that may not allow the processing timeline of NR being faster than LTE. Thus, some embodiments provide that the empty OFDM symbol may allow the NR timeline to operate at its available speed and thus generate a higher end user throughput for NR.

Referring to the second and third scenarios described above, embodiments herein may provide a resource efficient way of handling the same and/or different UEs in scheduling for the UL by multiplexing LTE and NR channels/signals together.

According to some embodiments, LTE UL/DL configuration 2 may be used to illustrate different embodiments. The embodiments, however, are not limited to LTE UL/DL configuration 2 nor are they limited to the TDD spectrum.

In some embodiments, for NR 30 kHz subcarrier spacing is assumed and normal CP. The inventive concept is not so limited as other subcarrier spacings be used with the applicable adjustments to the number of symbols and slots per LTE subframe. Similarly, another cyclic prefix length can be used with the proper adjustments.

Figure 6:
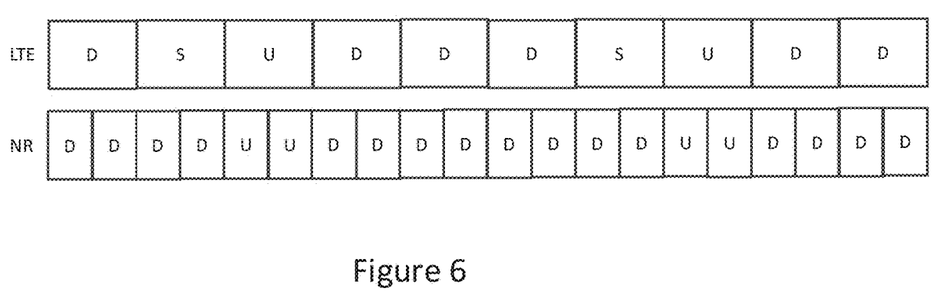
FIG. 6 is a schematic block diagram illustrating a frame structure including LTE and NR subframes without a gap according to some embodiments of the present inventive concept.

Brief reference is now made to FIG. 6, which is a schematic block diagram illustrating a frame structure including LTE and NR subframes without a gap according to some embodiments of the present inventive concept. In some embodiments, based on operating in a LTE UL/DL configuration 2, the NR side is assumed to be operating with a 30 kHz subcarrier spacing. In some embodiments, on the NR side the direction of the specific slots may not be signaled to the UE and may only be determined by the network on scheduled decision basis. A gap between downlink and uplink transmission on the NR side may avoid inter-base station interference. That gap is not illustrated in FIG. 6. Some embodiments provide that the gap between downlink and uplink transmission on the NR side may be aligned with the gap on the LTE side in the special subframe.

Some embodiments provide that a UE operating LTE may be configured with a cell-specific subframe configuration period and the cell-specific subframe offset for some of its UL subframes/UpPTS by an eNB. The UE may not be further configured or scheduled to transmit SRS in some of the configured instances of the UL subframes.

Figure 7:
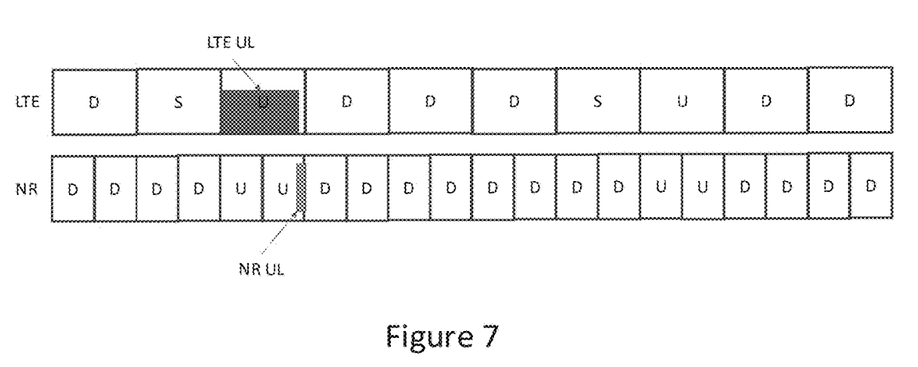
FIG. 7 is a schematic block diagram illustrating a frame structure including LTE and NR transmissions with cell specific SRS configured according to some embodiments of the present inventive concept.

The operation of the gNB may be determined based on the different scenarios described herein. For example, responsive to the first scenario described above, the NR side of the UE may transmit NR channel/signal in the gap that is created at the end of the slot that overlaps with the LTE UL subframe. Brief reference is made to FIG. 7, which is a schematic block diagram illustrating a frame structure including LTE and NR transmissions with cell specific SRS configured according to some embodiments of the present inventive concept. Since the NR transmission is not overlapping in time with the LTE transmission, the gNB may schedule such a transmission with shorter processing timeline assumptions than those that precede the LTE UL transmission. Some embodiments provide that this may further enable different scheduling timelines for LTE and NR. In some embodiments, the specific UL transmissions that may occur include either PUSCH or PUCCH on the LTE side and PUCCH, PUSCH or SRS on the NR side.

In some embodiments, the network can change the scheduling timing for NR DCI format 1-1 to support the same scheduling processing timing as LTE or slower for HARQ-ACK reporting. This may be accomplished by configuring the UE with set of values that enables this and utilizes them in the applicable way. Further, in some embodiments, the network may change the PUSCH scheduling timing so that it follows the longer scheduling timings. However, the network may not change the scheduling timing for HARQ-ACK feedback when the UE is scheduled with NR DCI format 1-0 because this may be provided by the specification and thus may not be configurable. Some embodiments may be utilized specifically for DCI format 1-0 scheduling for HARQ-ACK bits. For other scheduling, such embodiments may not be utilized. In some embodiments, specific occasions in time may utilized. In some circumstances, an overlap in scheduling between NR and LTE in the frequency domain may be allowed. In some embodiments, an overlap between NR and LTE scheduling in the frequency domain may not be allowed. In some embodiments, an overlap between NR and LTE in the frequency domain may not be allowed.

In some embodiments, a UE capability is provided in which the UE cannot handle NR and LTE channels/signals overlapping in time if NR timeline is not as slow as LTE. Some embodiments provide that the network may inform the gNB. The eNB may utilize the UE signaling capability according to embodiments herein. In some embodiments, the network then changes the scheduling timelines for NR DCI format 1-1 and for scheduling of PUSCH.

In the second scenario described above, embodiments may further provide that the network (eNB/gNB) may configure the LTE UE as described and schedule another NR UE. In this manner, a first UE may be operating in NR and the second US may be operating in LTE.

Some embodiments provide that responsive to the third scenario described above, embodiments herein may further include configuring the UE so that the LTE and NR carriers the single UE operates in an overlap relative to one another.

Figure 8:
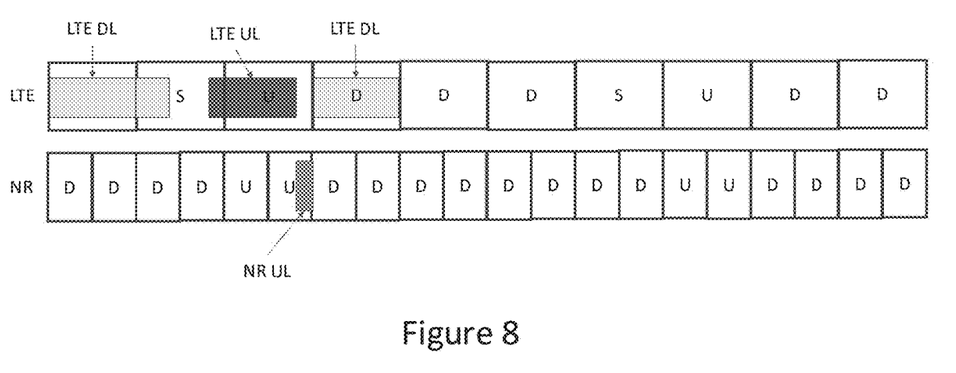
FIG. 8 is a schematic block diagram illustrating a frame structure including LTE and NR UL transmissions with LTE timing advance cell specific SRS configured according to some embodiments of the present inventive concept.

Reference is made to FIG. 8, which is a schematic block diagram illustrating a frame structure including LTE and NR UL transmissions with LTE timing advance cell specific SRS configured according to some embodiments of the present inventive concept. Some embodiments disclosed herein provide that a timing advance may be introduced on the LTE side to create a gap between UL and DL transmissions as illustrated in FIG. 8. In some embodiments, the LTE timing advance may be used in combination with the empty OFDM symbol discussed above. Such embodiments may provide an even larger gap at the end of the LTE UL transmission in FIG. 8. In some embodiments, the timing advance gap may be created by the eNB signaling a larger collective timing advance to the UE than what is required to handle propagation difference.

In the case of the first scenario described above, embodiments herein provide that the UEs NR side would transmit with the empty OFDM symbol and NR channel/signal when it does not overlap with an LTE channel. Embodiments may further include configuring the LTE timing advance.

Figure 11:
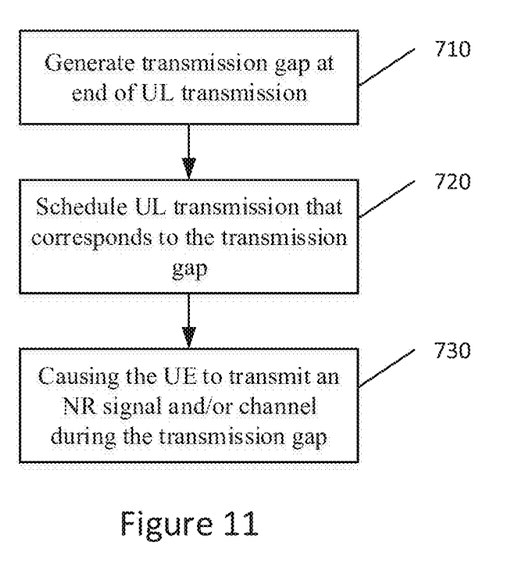
FIG. 11 is a flow chart illustrating operations of a wireless device according to some embodiments of inventive concepts.

Reference is now made to FIG. 11, which is a flow chart illustrating operations of a network device according to some embodiments of inventive concepts. Methods may include generating a transmission gap at an end of a first type of uplink, UL, transmission (block 710). In some embodiments, the UL transmission may include a first type of UL transmission, such as, for example, an LTE UL transmission.

In some embodiments, the transmission gap is generated by sending, to the UE, a radio resource control that configures a potential sounding reference signal, SRS, transmission that generates the transmission gap.

Some embodiments provide that the transmission gap is configured using a cell specific SRS pattern that includes an empty orthogonal frequency division multiplexing, OFDM, symbol. Some embodiments provide that the cell specific SRS pattern includes a cell specific subframe configuration period $T_{SFC}$ and a cell-specific subframe offset $\Delta_{SFC}$. Some embodiments provide that the UE is further configured not to transmit SRS in configured instances of UL subframes.

In some embodiments, the transmission gap is configured by a timing advance on an LTE transmission of the UE to create the transmission gap between the UL and DL transmissions. Some embodiments provide that the timing advance is applied on the LTE transmission to cause the transmission gap to be at an end of a corresponding UL subframe. For example, the transmission gap may be temporally adjacent an upcoming DL.

In some embodiments, the transmission gap includes a first portion and a second portion, the first portion of the transmission gap is configured using a cell specific SRS pattern and the second portion of the transmission gap is configured by a timing advance on an LTE transmission of the UE to create the transmission gap between the UL and DL transmissions.

Some embodiments include scheduling a second type of UL transmission that corresponds to the transmission gap (block 720). In some embodiments, second type of UL transmission includes an NR UL transmission. Some embodiments provide that the transmission gap and the NR UL transmission are both from the same UE. Some embodiments provide that the UE includes a first UE and a second UE that is different from the first UE. In such embodiments, the transmission gap is from the first UE and the NR UL transmission is from the second UE.

Some embodiments further include causing the UE to transmit an NR signal and/or channel during the transmission gap that is generated at an end of a subframe that overlaps with an LTE UL subframe (block 730).

Abbreviations:

At least some of the following abbreviations may be used in this disclosure. If there is an inconsistency between abbreviations, preference should be given to how it is used above. If listed multiple times below, the first listing should be preferred over any subsequent listing(s).

Abbreviation Explanation
CDM Code Division Multiplex
CQI Channel Quality Information
CRC Cyclic Redundancy Check
DCI Downlink Control Information
DFT Discrete Fourier Transform
DM-RS Demodulation Reference Signal
FDM Frequency Division Multiplex
HARQ Hybrid Automatic Repeat Request
OFDM Orthogonal Frequency Division Multiplex
PAPR Peak to Average Power Ratio
PUCCH Physical Uplink Control Channel
PUSCH Physical Uplink Shared Channel
SRS Sounding Reference Signal
PRACH Physical Random Access Channel
DC Dual-connectivity
PRB Physical Resource Block
RRC Radio Resource Control
UCI Uplink Control Information
EIRP Effective Isotropic Radiated Power
SS-block Synchronization Signal Block
CSI-RS Channel State Information Reference Signal
PBCH Primary Broadcast Channel In some embodiments, a more general term "network node" is used and it can correspond to any type of radio network node or any network node, which communicates with a UE and/or with another network node. Examples of network nodes are MN, SN, UPF, AMF, OAM, and OSS. Example network nodes may further include NodeB, Master eNB (MeNB), Secondary eNB (SeNB), a network node belonging to Master Cell Group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Unit (RRH), nodes in distributed antenna system (DAS), core network node (e.g. Mobile Switching Center (MSC), Mobility Management Entity (MME), etc), O&M, OSS, TCE, Self Organizing Network (SON), positioning node (e.g. E-SMLC), MDT, etc.

In some embodiments, the non-limiting term user equipment (UE) is used and it refers to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, ProSe UE, Vehicle-to-Vehicle (V2V) UE, Vehicle-to-Anything (V2X) UE, etc.

In some embodiments, the non-limiting term WAN (wireless access network or RAN, radio access network) node is used. The WAN node can be a UE (e.g. D2D UE) or a network node (e.g. access point, BS etc). The WAN node is also interchangeably called as cellular node, NW source node etc.

The term time resource used herein may correspond to any type of physical resource or radio resource expressed in terms of length of time. Examples of time resources are: symbol, time slot, subframe, radio frame, Transmission Time Interval (TTI), interleaving time etc.

The embodiments are described for 5G. However, the embodiments are applicable to any Radio Access Technology (RAT) or multi-RAT systems, where the UE receives and/or transmit signals (e.g. data) e.g. LTE Frequency Division Duplex (FDD)/Time Division Duplex (TDD), Wide Code Division Multiplexing Access (WCDMA)/High Speed Packet Access (HSPA), Global System for Mobile communication (GSM)/GSM EDGE Radio Access Network (GERAN), Wi Fi, Wide Local Area Network (WLAN), CDMA2000, 5G, NR, etc.

The invention claimed is:

1. A method of operating a network device in a telecommunications network, the method comprising:
transmitting a first signal to a first user equipment, UE, instructing the first UE to generate a transmission gap in a first type of uplink, UL, transmission, the first signal comprising a cell specific long term evolution, LTE, sounding reference signal, SRS, pattern that includes an empty orthogonal frequency division multiplexing, OFDM, symbol configured to generate the transmission gap at a time corresponding to a potential new radio, NR, transmission; and
transmitting a second signal to a second UE instructing the second UE to schedule a second type of UL transmission corresponding to the transmission gap, the second signal including instructions to schedule the potential NR transmission, which includes a physical uplink shared channel, PUSCH, or a physical uplink control channel, PUCCH.

2. The method of claim 1, wherein the first UE is an LTE UE and the second UE is a NR UE.

3. The method of claim 2, wherein the LTE UE and the NR UE are the same UE.

4. The method of claim 2, wherein the LTE UE and the NR UE are different UEs.

5. The method according to claim 1, wherein the cell specific LTE SRS pattern comprises a cell specific subframe configuration period $T_{SFC}$ and a cell-specific subframe offset $\Delta_{SFC}$.

6. The method according to claim 1, wherein transmitting the first signal comprises configuring the first UE not to transmit SRS in configured instances of UL subframes.

7. The method according to claim 1, wherein transmitting the first signal comprises instructing the first UE to include a timing advance on an LTE transmission of the first UE to create the transmission gap between the UL and down link, DL, transmissions.

8. The method according to claim 7, wherein the timing advance is applied on the LTE transmission to cause the transmission gap to be at an end of a corresponding UL subframe.

9. The method according to claim 1, wherein the transmission gap comprises a first portion and a second portion,
wherein the first portion of the transmission gap is configured using a cell specific SRS pattern, and
wherein the second portion of the transmission gap is configured by a timing advance on an LTE transmission of the first UE to create the transmission gap between the UL and down link, DL, transmissions.

10. The method according to claim 1, further comprising: causing, by the network device, the second UE to transmit an NR signal and/or channel during the transmission gap that is generated at an end of a subframe that overlaps with an LTE UL subframe; and
responsive to transmitting the second signal, receiving, via the second type of UL transmission and from the second UE, a third signal corresponding to the transmission gap.

11. A network node in a telecommunications network, the network node configured to perform operations comprising:
transmitting a first signal to a first user equipment, UE, instructing the first UE to generate a transmission gap at an end of a long term evolution, LTE, uplink, UL, transmission; and
transmitting a second signal to a second UE instructing the second UE to schedule a new radio, NR, UL transmission corresponding to the transmission gap,
wherein the transmission gap comprises a first portion and a second portion,
wherein the first portion of the transmission gap is configured using a cell specific SRS pattern, and
wherein the second portion of the transmission gap is configured by a timing advance on an LTE transmission of the UE to create the transmission gap between the UL and down link, DL, transmissions.

12. The network node according to claim 11, wherein transmitting the first signal comprises sending, to the UE, an LTE sounding reference signal, SRS, pattern that is configured to generate the transmission gap that at a time that corresponds with a potential new radio, NR, transmission.

13. The network node according to claim 12, wherein the potential NR transmission comprises an SRS.

14. The network node according to claim 11, wherein the first UE is an LTE UE and the second UE is a NR UE.

15. The network node according to claim 14, wherein the LTE UE and the NR UE are the same UE.

16. The network node according to claim 14, wherein the LTE UE and the NR UE are different UEs.

17. The network node according to claim 11, wherein the transmission gap is configured using a cell specific LTE SRS pattern that includes an empty orthogonal frequency division multiplexing, OFDM, symbol.

18. The network node according to claim 17, wherein the cell specific LTE SRS pattern comprises a cell specific subframe configuration period $T_{SFC}$ and a cell-specific subframe offset $\Delta_{SFC}$.

19. The network node according to claim 17, wherein transmitting the first signal comprises configuring the first UE not to transmit SRS in configured instances of UL subframes.

20. The network node according to claim 11, wherein transmitting the first signal comprises instructing the first UE to include a timing advance on an LTE transmission of the first UE to create the transmission gap between the UL and down link, DL, transmissions.

21. The network node according to claim 20, wherein the timing advance is applied on the LTE transmission to cause the transmission gap to be at an end of a corresponding UL subframe.

22. The network node according to claim 11, wherein the operations further comprise:
causing the second UE to transmit an NR signal and/or channel during the transmission gap that is generated at an end of a subframe that overlaps with an LTE UL subframe; and
responsive to transmitting the second signal, receiving, via the second type of UL transmission and from the second UE, a third signal corresponding to the transmission gap.

23. A non-transitory computer readable medium storing program code that when executed by a processor of a network node causes the network node to perform operations, the operations comprising:

transmitting a first signal to a first user equipment, UE, instructing the first UE to generate a transmission gap in a first type of uplink, UL, transmission, the first signal comprising a cell specific long term evolution, LTE, sounding reference signal, SRS, pattern that includes an empty orthogonal frequency division multiplexing, OFDM, symbol configured to generate the transmission gap at a time corresponding to a potential new radio, NR, transmission; and     transmitting a second signal to a second UE instructing the second UE to schedule a second type of UL transmission corresponding to the transmission gap, the second signal including instructions to schedule the potential NR transmission, which includes a physical uplink shared channel, PUSCH, or a physical uplink control channel, PUCCH.

\* \* \* \* \*

UNITED STATES PATENT AND TRADEMARK OFFICE
CERTIFICATE OF CORRECTION

PATENT NO. : 10,917,264 B2
APPLICATION NO. : 16/186337
DATED : February 9, 2021
INVENTOR(S) : Bergljung et al.

It is certified that error appears in the above-identified patent and that said Letters Patent is hereby corrected as shown below:

In the Specification

In Column 5, Line 63, delete "mow" and insert -- now --, therefor.

In Column 6, Line 4, delete "πt and π2" and insert -- $\tau1$ and $\tau2$ --, therefor.

In Column 6, Line 37, delete "π=0.33 ms," and insert -- $\tau$=0.33 ms, --, therefor.

In Column 6, Line 50, delete "due a" and insert -- due to a --, therefor.

In Column 6, Line 52, delete "that the" and insert -- than the --, therefor.

In Column 6, Line 56, delete "PA" and insert -- TA --, therefor.

In Column 7, Line 10, delete "possible to" and insert -- possible for --, therefor.

In Column 8, Line 44, delete "may utilized." and insert -- may be utilized. --, therefor.

In Column 9, Line 48, delete "adjacent" and insert -- adjacent to --, therefor.

In Column 10, Line 5, delete "an" and insert -- any --, therefor.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*